(12) United States Patent
Pan

(10) Patent No.: US 8,423,848 B2
(45) Date of Patent: Apr. 16, 2013

(54) SERVER AND METHOD FOR TESTING INTER-INTEGRATED CIRCUIT DEVICES

(75) Inventor: Li-Fu Pan, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/308,554

(22) Filed: Dec. 1, 2011

(65) Prior Publication Data

US 2012/0173944 A1 Jul. 5, 2012

(30) Foreign Application Priority Data

Dec. 31, 2010 (CN) .......................... 2010 1 0619627

(51) Int. Cl.
*G01R 31/28* (2006.01)
(52) U.S. Cl.
USPC .......................................................... 714/734
(58) Field of Classification Search .................. 714/734
See application file for complete search history.

(56) References Cited

U.S. PATENT DOCUMENTS

| | | | | |
|---|---|---|---|---|
| 5,432,797 A * | 7/1995 | Takano | ........................ | 714/718 |
| 6,412,087 B1 * | 6/2002 | Matsumoto | .................. | 714/738 |
| 6,745,310 B2 * | 6/2004 | Chow et al. | ................... | 711/170 |
| 7,003,697 B2 * | 2/2006 | Magliocco | ....................... | 714/25 |
| 7,130,229 B2 * | 10/2006 | Dahlen et al. | ................. | 365/200 |
| 7,254,663 B2 * | 8/2007 | Bartley et al. | ................. | 710/305 |
| 7,334,027 B2 * | 2/2008 | Nakajima et al. | ............. | 709/221 |
| 7,421,632 B2 * | 9/2008 | Jordan et al. | .................. | 714/724 |
| 7,496,787 B2 * | 2/2009 | Edwards et al. | ................ | 714/13 |
| 7,512,024 B2 * | 3/2009 | Lee et al. | ....................... | 365/201 |
| 7,543,177 B2 * | 6/2009 | Bullen et al. | ................... | 714/6.1 |
| 7,657,665 B2 * | 2/2010 | Dalton et al. | ..................... | 710/5 |
| 7,770,077 B2 * | 8/2010 | Arimilli et al. | ............... | 714/710 |
| 7,844,866 B2 * | 11/2010 | Austen et al. | .................. | 714/57 |
| 8,132,074 B2 * | 3/2012 | Bains et al. | .................... | 714/758 |
| 8,140,936 B2 * | 3/2012 | Gower et al. | ................. | 714/758 |
| 8,260,923 B2 * | 9/2012 | Shinohe et al. | ............... | 709/226 |
| 8,312,319 B2 * | 11/2012 | Hatasaki et al. | ............... | 714/13 |

* cited by examiner

*Primary Examiner* — James C Kerveros
(74) *Attorney, Agent, or Firm* — Altis Law Group, Inc.

(57) ABSTRACT

A server includes a baseboard management controller (BMC). More than one inter-integrated circuit (I2C) device may be connected to the BMC via a multiplexing switch. The server sets a first identifier for indicating which channels of I2C device are open, and a second identifier for indicating which channels of the I2C devices are closed, and sends the set information to the BMC. To test a selected I2C device, the server opens a channel to the selected I2C device and assigns the first identifier to the channel of the selected I2C device. During testing of the selected I2C device, if the BMC intends to access a different I2C device, the BMC waits for the identifier of the selected I2C device to change from the first identifier to the second identifier, and then opens a channel to the different I2C device.

12 Claims, 3 Drawing Sheets

SERVER AND METHOD FOR TESTING INTER-INTEGRATED CIRCUIT DEVICES

BACKGROUND

1. Technical Field

The embodiments of the present disclosure relate to data accessing technology, and particularly to a server and a method for testing inter-integrated circuit (I2C) devices.

2. Description of Related Art

I2C devices, such as temperature sensors and memory devices, may be directly connected to different bus segments of an I2C bus that connects with a baseboard management controller (BMC) of a server. In this situation, each I2C device is assigned a unique bus address.

However, the I2C bus has limited address resources. Therefore, in order to connect more I2C devices, a switch (such as a multiplexer) may be used to connect more than one I2C device to the same bus segment of the I2C bus. In such a situation, the more than one I2C device share the same bus address but have different channels with the BMC, and so cannot be accessed at the same time. For reading data from a designated I2C device, only the channel of the designated I2C is opened via the switch while all other channels are closed. If two or more programs need to access different I2C devices connected to the switch, conflicts may occur. For example, the BMC may use a monitor program to periodically read data from each I2C device, and a test program may be used to read data from an I2C device to be tested. If the objects accessed by the two programs are different, either program may read undesired data.

DETAILED DESCRIPTION

The disclosure is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
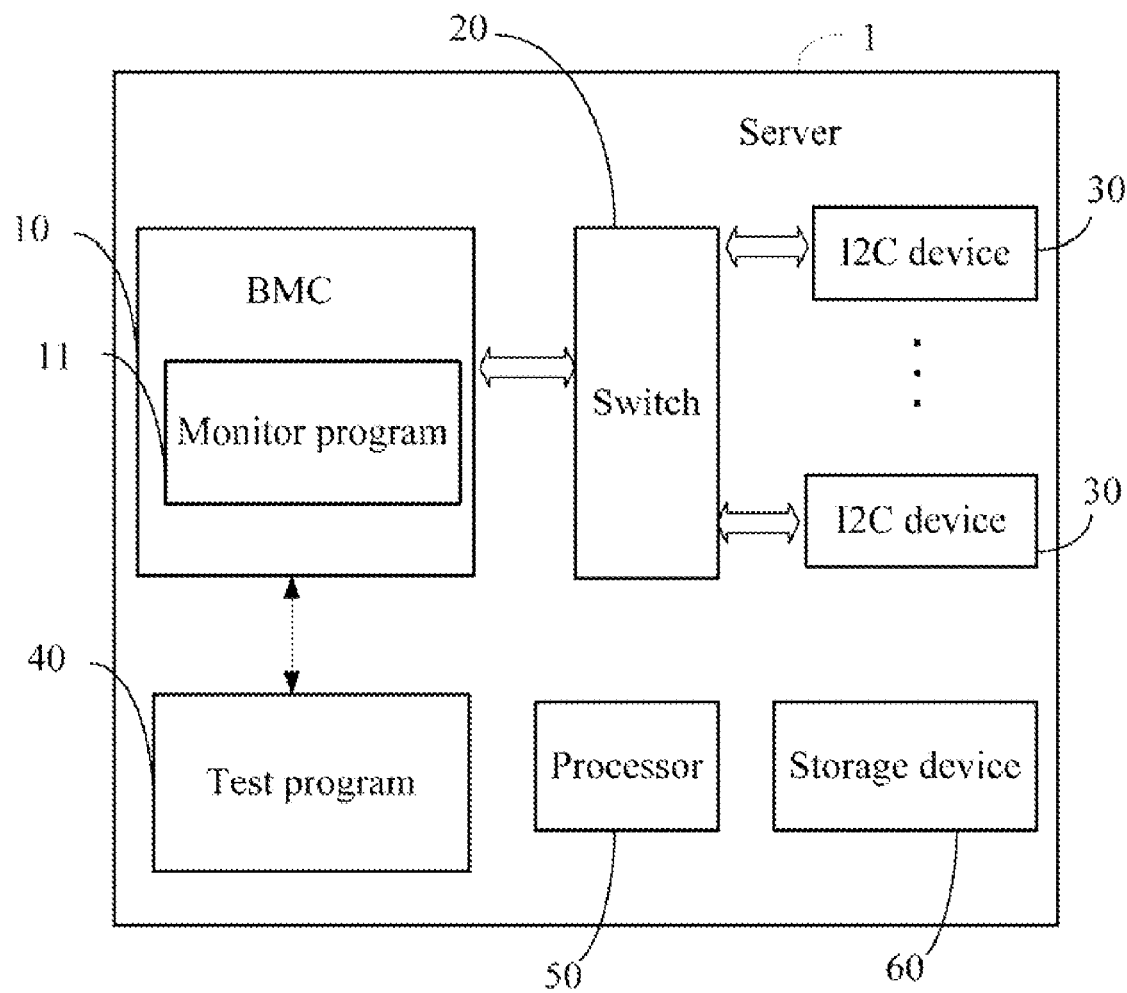
FIG. 1 is a block diagram of one embodiment of a server including a testing program for testing inter-integrated circuit (I2C) devices.

FIG. 1 is a block diagram of one embodiment of a server 1. In one embodiment, the server 1 includes a baseboard management controller (BMC) 10. A plurality of inter-integrated circuit (I2C) devices 30 (only two are shown) are connected to the BMC 10 via a switch 20. The switch 20 may be a multiplexer. The I2C devices 30 may include different types of sensors, power supplies, memory devices, or any other suitable device. The BMC 10 includes a monitor program 11 that includes instructions to be processed by the BMC 10 for taking periodic readings, such as temperature, cooling fan speed, power status, and operating system status (parameters), from the I2C devices 30. If any one of the parameters does not stay within preset limits, the BMC 10 will send an alert to an administrator of the server 1. It should be appreciated that the switch 20 only opens one channel between an I2C device 30 and the BMC 10 at a time, while the channels between all other I2C devices 30 and the BMC 10 are closed.

Figure 2:
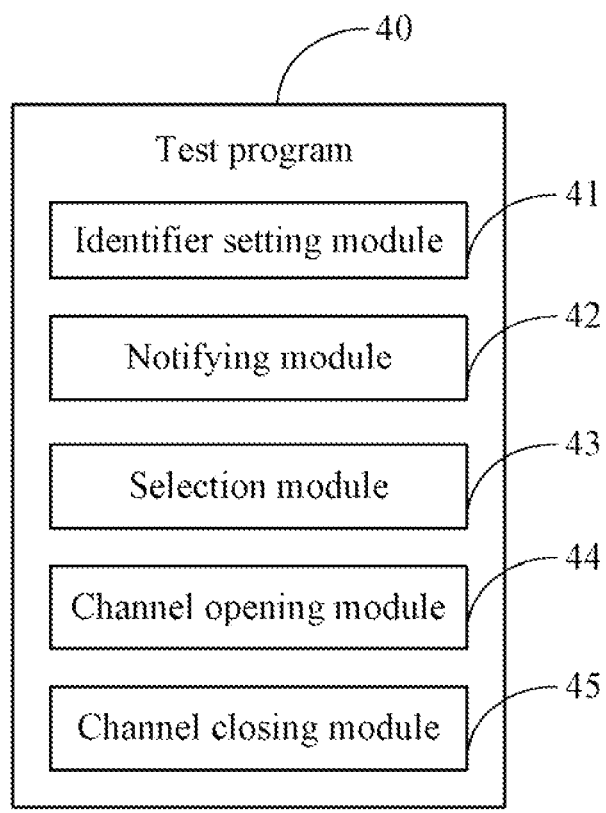
FIG. 2 is a block diagram of one embodiment of function modules of the test program shown in FIG. 1.
Figure 3:
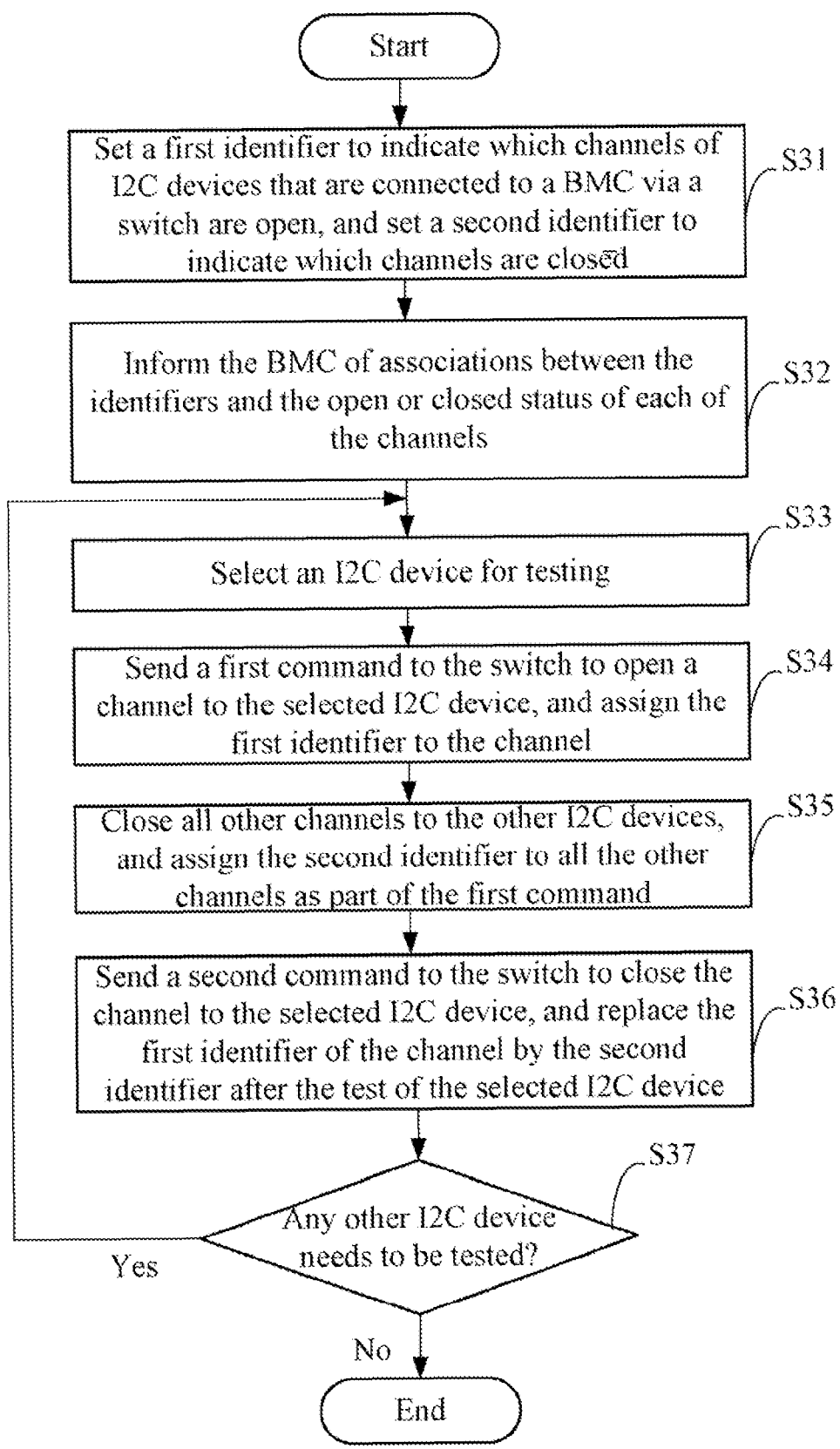
FIG. 3 is a flowchart of one embodiment of a method for testing I2C devices.

As shown in FIG. 1, the server 1 further includes a test program 40 to test the functions of the I2C devices 30, such as testing the read/write functions of the memory devices, and prevent conflicts with the monitor program 10 and the reading of wrong test data, in a situation where the two programs desire to simultaneously access two different I2C devices 30 thus needing two different channels. As shown in FIG. 2, the test program 40 includes an identifier setting module 41, a notifying module 42, a selection module 43, a channel opening module 44, and a channel closing module 45. The modules 41-45 may include computerized code in the form of one or more programs that are stored in a storage device 60 of the server 1. The computerized code includes instructions to be processed by a processor 50 of the server 1 for providing the above-mentioned functions of the test program 40. A description of the functions of the modules 41-45 is illustrated in FIG. 3. The storage device 60 may be a cache or a dedicated memory, such as an EPROM, HDD, or flash memory.

FIG. 3 is a flowchart of one embodiment of a method for testing the I2C devices 30. Depending on the embodiment, additional blocks may be added, others removed, and the ordering of the blocks may be changed.

In block S31, the identifier setting module 41 sets a first identifier to indicate which channels of the I2C devices 30 are open, and sets a second identifier to indicate which the channels of the I2C devices 30 are closed. For example, the first identifier may be the digital value "1", and the second identifier may the digital value "0". If a channel of an I2C device 30 has the identifier "1", it indicates that the channel of the I2C device 30 is open. If the channel of the I2C device 30 has the identifier "0", it indicates that the channel of the I2C device is closed.

In block S32, the notifying module 42 informs the BMC 10 of associations between the identifiers and the open or closed status of each of the channels of the I2C devices. Therefore, if the monitor program 11 intends to access a sample I2C device 30, such as a temperature sensor, the monitor program 11 may check the channel identifiers of all the I2C devices 30. If a channel of any I2C device 30 (such as an EEPROM) already has the first identifier "1", which indicates the EEPROM is under test, the monitor program 11 will wait for the identifier of the EEPROM to change to "0", which indicates the EEPROM has completed the test, and then open the channel of the temperature sensor for accessing the temperature sensor.

In block S33, the selection module 43 selects an I2C device 30 for testing. The selection operation may be done automatically according to a sequence of logical numbers (such as 01, 02, 03 . . . ) assigned to the I2C devices 30 by the server 1, or be done manually by a test engineer. For example, the EEPROM may be selected to test.

In block S34, the channel opening module 44 sends a first command to the switch 20 to open a channel to the selected I2C device 30, and assigns a first identifier, such as the digital value "1", to the channel to the selected I2C device 30.

In block S35, the switch 20 closes all other channels to the other I2C devices 30, and assigns a second identifier, such as the digital value "0", to all the other channels as part of the first command.

In block S36, the channel closing module 44 sends a second command to the switch 30 to close the channel to the selected I2C device 30, and replaces the first identifier (such as the digital value "1") of the channel by the second identifier (such as the digital value "0") after the test of the selected I2C device 30.

In block S37, the selection module 43 checks if any remaining I2C devices 30 need to be tested. If any other I2C device 30 needs to be tested, the procedure repeats from block S33. If no device 30 needs to be tested, the procedure ends.

The present embodiments inform the BMC 10 as to which I2C device 30 is under test via the setting identifiers for indicating the open or closed status of each of the channels for all of the I2C devices 30, to prevent the BMC 10 by accident or otherwise closing the channel of the I2C device 30 that is under test.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method executed by a processor of a server for testing inter-integrated circuit (I2C) devices connected to a baseboard management controller (BMC) of the server via a switch, the method comprising:
setting a first identifier to indicate which channels of the I2C devices are active and setting a second identifier to indicate which channels of the I2C devices are inactive;
informing the BMC of associations between the identifiers and the active or inactive status of each of the channels of the I2C devices;
sending a first command to the switch to activate a channel to a selected I2C device for test, and assigning the first identifier to the channel of the selected I2C device;
inactivating all other channels to the other I2C devices, and assigning the second identifier to all the other channels as part of the first command; and
sending a second command to the switch to inactivate the channel to the selected I2C device, and replacing the first identifier of the channel by the second identifier after the test of the selected I2C device.

2. The method of claim 1, further comprising:
checking if any remaining I2C devices need to be tested, and repeating from the selecting block in response that any other I2C device needs to be tested.

3. The method of claim 1, wherein the selected I2C device is selected automatically according to a sequence of logical numbers assigned to the I2C devices by the server.

4. The method of claim 1, wherein when the BMC intends to access a desired I2C device, the BMC performs operations of:
checking the identifiers of all channels of all the I2C devices;
determining if a different I2C device has the first identifier, which indicates the different I2C device is under test; and
in response that the different I2C device has the first identifier, waiting for the first identifier of the different I2C device to be replaced by the second identifier, then activating the channel of the desired I2C device, to prevent inactivating the channel of the different I2C device during the test of the different I2C device.

5. A non-transitory medium storing a set of instructions, the set of instructions capable of being executed by a processor of a server for testing inter-integrated circuit (I2C) devices connected to a baseboard management controller (BMC) of the server via a switch, the method comprising:
setting a first identifier to indicate which channels of the I2C devices are active and setting a second identifier to indicate which channels of the I2C devices are inactive;
informing the BMC of associations between the identifiers and the active or inactive status of each of the channels of the I2C devices;
sending a first command to the switch to activate a channel to a selected I2C device for test, and assigning the first identifier to the channel of the selected I2C device;
inactivating all other channels to the other I2C devices, and assign the second identifier to all the other channels as part of the first command; and
sending a second command to the switch to inactivate the channel to the selected I2C device, and replacing the first identifier of the channel by the second identifier after the test of the selected I2C device.

6. The medium of claim 5, wherein the method further comprises: checking if any remaining I2C devices need to be tested, and repeating from the selecting block in response that any other I2C device needs to be tested.

7. The medium of claim 5, wherein the selected I2C device is selected automatically according to a sequence of logical numbers assigned to the I2C devices by the server.

8. The medium of claim 5, wherein when the BMC intends to access a desired I2C device, the BMC performs operations of:
checking the identifiers of all channels of all the I2C devices;
determining if a different I2C device has the first identifier, which indicates the different I2C device is under test; and
in response that the different I2C device has the first identifier, waiting for the first identifier of the different I2C device to be replaced by the second identifier, then opening activating the channel of the desired I2C device, to prevent closing inactivating the channel of the different I2C device during the test of the different I2C device.

9. A server, comprising:
a baseboard management controller (BMC);
a plurality of inter-integrated circuit (I2C) devices connected to the BMC via a switch;
a storage device;
a processor; and
one or more programs stored in the storage device and being executable by the processor, the one or more programs comprising instructions to:
set a first identifier to indicate which channels of the I2C devices are active and set a second identifier to indicate which channels of the I2C devices are inactive;
inform the BMC of associations between the identifiers and the active or inactive status of each of the channels of the I2C devices;
send a first command to the switch to activate a channel to a selected I2C device for test, and assign the first identifier to the channel;
inactivate all other channels to the other I2C devices, and assign the second identifier to all the other channels as part of the first command; and
send a second command to the switch to inactivate the channel to the selected I2C device, and replace the first identifier of the channel by the second identifier after the test of the selected I2C device.

10. The server of claim 9, wherein the one or more programs further comprising instructions to: check if any remaining I2C devices need to be tested, and repeating from the selection operation in response that any other I2C device needs to be tested.

11. The server of claim 9, wherein the selected I2C device is selected automatically according to a sequence of logical numbers assigned to the I2C devices by the server, or is done manually by a test engineer.

12. The server of claim 9, wherein the BMC comprising instructions to:
- check the identifiers of all channels of all the I2C devices when the BMC intends to access a desired I2C device;
- determine if a different I2C device has the first identifier, which indicates the different I2C device is under test; and
- in response that the different I2C device has the first identifier, wait for the identifier of the different I2C device to be replaced by the second identifier, then activate the channel of the desired I2C device, to prevent inactivating the channel of the different I2C device during the test of the different I2C device.

* * * * *